United States Patent
Kim et al.

(10) Patent No.: US 9,491,657 B2
(45) Date of Patent: Nov. 8, 2016

(54) INCORPORATION OF MESH BASE STATIONS IN A WIRELESS SYSTEM

(71) Applicant: AT&T Intellectual Property II, L.P., Atlanta, GA (US)

(72) Inventors: Byoung-Jo J. Kim, Morganville, NJ (US); Nemmara K. Shankaranarayanan, Bridgewater, NJ (US); Amit Kumar Saha, Houston, TX (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 187 days.

(21) Appl. No.: 13/970,190

(22) Filed: Aug. 19, 2013

(65) Prior Publication Data
US 2013/0336297 A1    Dec. 19, 2013

Related U.S. Application Data

(63) Continuation of application No. 11/319,964, filed on Dec. 28, 2005, now Pat. No. 8,537,761.

(51) Int. Cl.
| | |
|---|---|
| *H04J 3/00* | (2006.01) |
| *H04W 28/02* | (2009.01) |
| *H04W 52/34* | (2009.01) |
| *H04W 92/20* | (2009.01) |
| *H04W 52/14* | (2009.01) |

(52) U.S. Cl.
CPC ......... *H04W 28/021* (2013.01); *H04W 52/343* (2013.01); *H04W 52/143* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 6,519,467 B1 | 2/2003 | Strakovsky | |
| 6,650,907 B1 | 11/2003 | Kamperschroer et al. | |
| 6,690,915 B1 | 2/2004 | Ito et al. | |
| 7,164,919 B2 | 1/2007 | Chen | |
| 7,386,036 B2 * | 6/2008 | Pasanen | H04W 88/06 370/293 |
| 7,403,506 B2 | 7/2008 | Lee et al. | |
| 7,496,078 B2 | 2/2009 | Rahman | |
| 7,555,261 B2 | 6/2009 | O'Neill | |

(Continued)

OTHER PUBLICATIONS

Office Action dated Jan. 14, 2010 for U.S. Appl. No. 11/319,964, 29 pages.

(Continued)

*Primary Examiner* — Willie J Daniel, Jr.
(74) *Attorney, Agent, or Firm* — Amin, Turocy & Watson, LLP

(57) ABSTRACT

Incorporating and operating a mesh base station in a wireless network is described. The mesh base station can utilize common wireless resource allocations as a corresponding wireless base station while transmitting to wireless subscriber stations during the same time period. The mesh base station obtains a data packet from the wireless base station over a backhaul link during a scheduled time period and transmits the data packet to the designated wireless subscriber station during another scheduled time period. The wireless base station and the mesh base station can also receive data packets from wireless subscriber stations during a same time period. A wireless network can be configured with two mesh base stations at an approximate boundary of two adjacent sector coverage areas, where a coverage area is supported by a wireless base station and each mesh base station supports wireless subscriber stations within a coverage radius.

20 Claims, 22 Drawing Sheets

(56) References Cited

U.S. PATENT DOCUMENTS

| | | | |
|---|---|---|---|
| 7,620,370 | B2 | 11/2009 | Barak et al. |
| 7,626,967 | B2 | 12/2009 | Yarvis et al. |
| 7,652,984 | B1 | 1/2010 | Kotecha |
| 7,729,329 | B2 | 6/2010 | Fujita et al. |
| 7,925,295 | B2 | 4/2011 | Yanover et al. |
| 8,077,663 | B2 * | 12/2011 | Mighani ............... H04W 84/00 370/255 |
| 8,149,756 | B2 * | 4/2012 | Hottinen ............... H04B 7/155 370/243 |
| 8,537,761 | B1 * | 9/2013 | Kim et al. .................... 370/329 |
| 2002/0131387 | A1 * | 9/2002 | Pitcher .................. H04W 16/16 370/338 |
| 2003/0108087 | A1 | 6/2003 | Shperling et al. |
| 2003/0134642 | A1 | 7/2003 | Kostic et al. |
| 2003/0169720 | A1 | 9/2003 | Sebastian et al. |
| 2004/0095907 | A1 | 5/2004 | Agee et al. |
| 2004/0132477 | A1 | 7/2004 | Lundby et al. |
| 2004/0156322 | A1 | 8/2004 | Mehra |
| 2004/0156384 | A1 | 8/2004 | Rune et al. |
| 2004/0167988 | A1 | 8/2004 | Rune et al. |
| 2004/0174900 | A1 | 9/2004 | Volpi et al. |
| 2005/0025099 | A1 | 2/2005 | Heath et al. |
| 2005/0068902 | A1 | 3/2005 | Rath |
| 2005/0128988 | A1 | 6/2005 | Simpson et al. |
| 2005/0153725 | A1 | 7/2005 | Naghian et al. |
| 2005/0170776 | A1 | 8/2005 | Siorpaes |
| 2005/0192037 | A1 | 9/2005 | Nanda et al. |
| 2005/0239466 | A1 | 10/2005 | Calin et al. |
| 2005/0272430 | A1 | 12/2005 | Griebling |
| 2006/0025136 | A1 | 2/2006 | Fujita et al. |
| 2006/0039286 | A1 | 2/2006 | Basu et al. |
| 2006/0039298 | A1 | 2/2006 | Zuniga et al. |
| 2006/0062197 | A1 | 3/2006 | Maddern et al. |
| 2006/0068849 | A1 | 3/2006 | Bernhard et al. |
| 2006/0083205 | A1 | 4/2006 | Buddhikot et al. |
| 2006/0084379 | A1 | 4/2006 | O'Neill |
| 2006/0099954 | A1 | 5/2006 | Henderson et al. |
| 2006/0252448 | A1 | 11/2006 | Ichikawa |
| 2006/0268908 | A1 | 11/2006 | Wang et al. |
| 2007/0015462 | A1 * | 1/2007 | Dean .................. H04B 7/15557 455/15 |
| 2007/0147255 | A1 | 6/2007 | Oyman |
| 2007/0147377 | A1 | 6/2007 | Laroia et al. |
| 2008/0075178 | A1 * | 3/2008 | Lappetelainen ....... H04B 7/155 375/260 |
| 2009/0270027 | A1 | 10/2009 | O'Neill |
| 2009/0303918 | A1 | 12/2009 | Ma et al. |
| 2010/0227620 | A1 * | 9/2010 | Naden .................. H04B 7/2606 455/445 |

OTHER PUBLICATIONS

Office Action dated Jun. 21, 2010 for U.S. Appl. No. 11/319,964, 11 pages.

Office Action dated Jan. 6, 2011 for U.S. Appl. No. 11/319,964, 14 pages.

Office Action dated Jun. 22, 2011 for U.S. Appl. No. 11/319,964, 27 pages.

Office Action dated Feb. 16, 2012 for U.S. Appl. No. 11/319,964, 24 pages.

Office Action dated Sep. 17, 2012 for U.S. Appl. No. 11/319,964, 23 pages.

Cho, et al., "On the Throughput Enhancement of the Downstream Channel in Cellular Radio Networks Through Multihop Relaying", IEEE Journal on Selected Areas in Communication, Sep. 2004, pp. 1206-1219, vol. 22, No. 7, IEEE.

* cited by examiner

900

Modulation schemes considered

| MODULATION | CODE RATE | REQUIRED SINR (dB) | DATA RATE (Mbps) $r_i$ |
|---|---|---|---|
| QPSK | 1/2 | 6.6 | 6.0 |
| 16-QAM | 1/2 | 10.5 | 12.0 |
| 64-QAM | 2/3 | 15.3 | 24.0 |
| 64-QAM | 3/4 | 20.8 | 27.0 |

901 → QPSK
903 → 16-QAM
905 → 64-QAM (2/3)
907 → 64-QAM (3/4)

FIG. 9

Simulation parameters used

| PARAMETER | VALUE |
|---|---|
| Frequency reuse | (1,6,6) |
| Cell size | 1000 m |
| BS antenna gain | 20 dBi |
| mBS antenna gain | 0 dBi |
| BS antenna height | 30 m |
| mBS antenna height | 15 m |
| SS antenna height | 2 m |
| Transmit power | 30 dBm |
| Power control | No |
| Large scale fading model | Erceg-Greenstein (Terrain A) |

INCORPORATION OF MESH BASE STATIONS IN A WIRELESS SYSTEM

CROSS-REFERENCE

This patent application is a continuation of, and claims priority to, U.S. patent application Ser. No. 11/319,964 (now U.S. Pat. No. 8,537,761), filed on Dec. 28, 2005, and entitled "INCORPORATION OF MESH BASE STATIONS IN A WIRELESS SYSTEM." The entirety of the aforementioned application is incorporated by reference herein.

BACKGROUND

FIG. 1 shows a generic mesh network 100 according to prior art. Generic wireless mesh network 100 (also referred as a client mesh network), includes nodes (subscriber stations) 101 and 117 in a wireless network forwarding traffic cooperatively over multiple radio links. Some of the participating nodes have wired connectivity to the Internet and hence serve as gateway nodes providing internet connectivity to the entire network. The architecture is economical when coverage, and not necessarily capacity, of the network is of primary concern. Mesh network 100 exemplifies a typical mesh network. Current commercial, community, and public safety mesh networks are typically compatible with WiFi®, which is based on the IEEE 802.11 standard. Commercial players include companies such as Motorola, Nokia, Microsoft, Tropos, Mesh Networks, BelAir, Nortel, FireTide, Propagate, Strix, Mesh Dynamics, MeshAP, MIT Rooftop, Rice TAPs. Examples of municipality WiFi mesh networks can be found in Urbana, Kingsbridge, Queensland, MuniWireless (France), Philadelphia, San Francisco, Seattle, Portland, Chicago. The proliferation of mesh networks has already started even though the current WiFi-based trends promise coverage rather than capacity.

With the ubiquity of wireless subscriber stations, there is a real need in the market place to expand wireless mesh architecture to a wireless system to increase the coverage and the traffic capacity of a wireless system.

BRIEF DESCRIPTION OF THE DRAWINGS

FIG. 9 shows examples of a modulation configurations in accordance with various embodiments.

FIG. 10 shows an example of simulation parameters in accordance with an embodiment.

DETAILED DESCRIPTION

Figure 1:
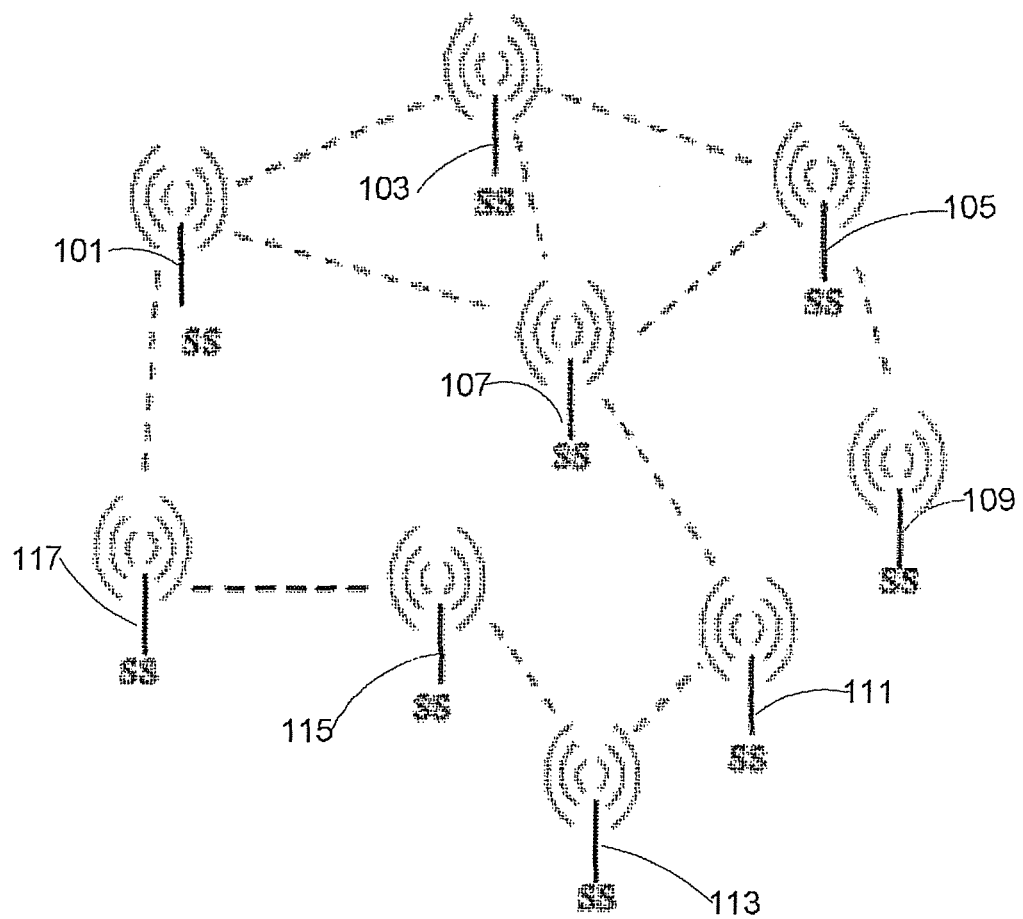
FIG. 1 shows a generic mesh network according to prior art.

In the following description of the various embodiments, reference is made to the accompanying drawings which form a part hereof, and in which is shown by way of illustration various embodiments can be practiced. It is to be understood that other embodiments can be utilized and structural and functional modifications can be made without departing from the scope of various aspects described herein. Definitions for the following terms are included to facilitate an understanding of the detailed description.

mesh base station—an infrastructure entity that wirelessly relays data to and from a corresponding wireless base station;

wireless resource allocation—a configurable wireless communication characteristic, e.g., frequency allocation (frequency division multiple access), code sequence allocation (code division multiple access), time slot allocation (time division multiple access), etc. Moreover, a wireless resource allocation can be specified as a combination of component resource allocations, e.g., a combination of frequency and time slot allocations.

In accordance with various embodiments, a mesh base station can utilize common wireless resource allocations as a corresponding wireless base station. In an aspect, a wireless base station and a mesh base station transmit to corresponding wireless subscriber stations during the same time period. As an example, regarding a scheduling downlink, mapping can be compatible with a frame structure that is supported by the IEEE 802.16 standard. Furthermore, either the wireless base station or the mesh base station can transmit to another wireless subscriber station during another time period of the frame structure.

In another aspect, a mesh base station obtains a data packet from a wireless base station over a backhaul link: that corresponds to a scheduled time period. The mesh base station consequently transmits the data packet to the designated wireless subscriber station during another scheduled time period. The other scheduled time period can be a dedicated time period or a simultaneous time period.

In yet another aspect, a wireless base station and a mesh base station receives data packets from corresponding wireless subscriber stations during the same time period. Data packets can also be transmitted to the wireless subscriber stations either in a symmetric manner or an asymmetric manner.

In one aspect, a mesh base station can be reconfigured to support wireless traffic if a wireless base station goes out of service or exceeds a predetermined traffic load. In such scenarios, a backhaul link is established to another wireless base station.

In another aspect, a wireless network is configured with two mesh base stations at an approximate boundary of two adjacent sector coverage areas. Each sector coverage area is supported by a corresponding wireless base station. Each mesh base station supports wireless subscriber stations within a configured coverage radius and connects to one of the wireless base stations over a backhaul link.

Figure 2:
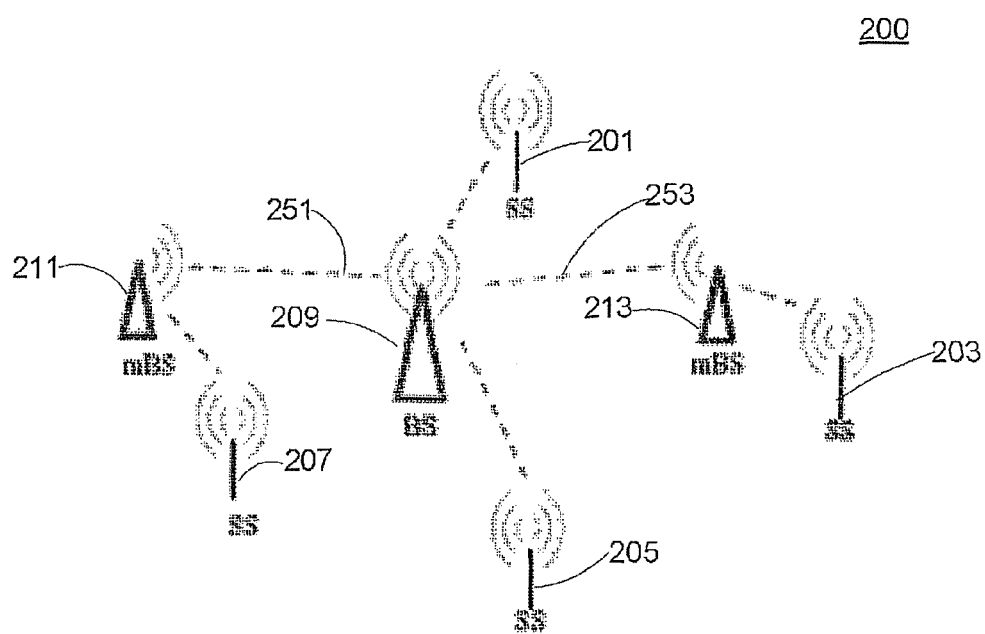
FIG. 2 shows a mesh network according to various aspects.

FIG. 2 shows a mesh network 200 according to embodiments. Mesh network 200 can be referred as an infrastructure mesh network because mesh base stations 211-213 are considered part of the wireless network with wireless base station 209. (In contrast, generic mesh network 100 comprises only wireless subscriber stations to support a wireless mesh network.) Mesh network 200 is fundamentally different from generic mesh network 100 because of the fact that additional mesh base stations (mBS) 211-213 are strategically deployed and controlled by wireless system 200 to wirelessly forward traffic from subscriber stations (SS) 203 and 207 to base station (BS) 209. The BS↔mBS links 251 and 253 are referred as backhaul links. Additionally, SS 201 and SS 205 communicate directly with BS 209.

FIG. 2 depicts single cell in mesh network 200. A cell is defined as the area that around BS 209 such that any SS in the coverage area can connect to the Internet via the particular BS. Of course, cells can overlap thus allowing users to select among multiple possible base stations. Infrastructure mesh network 200 attempts to change the economics of micro-cell wireless networks by aggregating traffic for wired backhaul. Transmission cost for wired backhaul can be a significant cost in high capacity radio networks. Infrastructure mesh network 200 also can provide advantages over a client mesh network, e.g., generic mesh network 100. For example, security, predictability, and manageability can be facilitated since the mesh base stations 211-213 are centrally deployed and controlled. Unlike in a client mesh network, users do not forward (relay) any data packets. A user either directly communicates with BS 209 or communicates with mBS 211 or 213, which then subsequently forwards traffic to and from the BS 209. (Each communications link, as shown in FIG. 2 is bidirectional. The wireless subscriber station transmits to the wireless infrastructure on the uplink and receives from the wireless infrastructure on the downlink.)

Since mBS 211 or 213 is deployed by the wireless system 200, the mBS antenna is better placed than the antenna of a normal user and hence the BS↔BS link is optimized to be a high-rate link. Moreover, mBS↔SS links are typically shorter on average than mBS↔BS links, thus requiring lesser transmission power and hence causing lesser interference to other users as well as other cells. Due to these lucrative advantages offered by an infrastructure mesh, most commercial WiFi mesh systems mentioned earlier are actually infrastructure mesh systems, i.e., the wireless system carefully deploys and controls the base stations.

According to embodiments, variations of infrastructure mesh network 200 can be supported. For example the BS ↔mBS backhaul 251 or 253 can use a different spectrum than the spectrum used for the SS↔BS and the SS↔mBS links. This can lead to an economic problem due to the requirement of extra spectrum. Moreover, once a particular spectrum is dedicated to backhaul link 251 or 253, the corresponding frequency spectrum cannot be used for other purposes, thus preventing flexible use of the spectrum. As a result, the economical choice corresponds to having backhaul link 251 or 253 share the same spectrum as that being used by the clients. This choice has several other advantages as well such as requiring the same type of radio technology on the wireless subscriber stations (clients) the BS, and the mBS. Since the spectrum is shared, there is a natural tendency to design for flexible and frugal use of the shared spectrum. Owing to these reasons, one chooses to analyze the later option, i.e., to analyze, in terms of capacity and outage, the performance of an infrastructure mesh with a single spectrum being shared by all links in a cell.

According to an embodiment, in order to proceed with an analysis, one can impose simplifying assumptions. First, one assumes the existence of a centralized medium access control (MAC) packet radio system 2 such as found in IEEE 802.16/WiMAX, CDMA EV-DO, UMTS-HSDPA, etc. (For example, BS 209, mBS 211, and mBS 213 control access while wireless subscriber stations 201-207 do not.) Second, one assumes that users are uniformly distributed in the analyzed area and that users always have backlogged data to send and receive, i.e., users have infinite bandwidth requirement. Finally, as a design principle, one imposes that the mBS support an infrastructure mesh need having "low complexity." This design principle has the following consequences:

the mBS should be smaller than the BS.
the mBS should have a single radio to communicate with both the BS and subscribers; and
the mBS should use an omni-directional antenna to communicate with the subscribers.

Consequently, one requires that an mBS (211,213) should have similar complexity as a SS (201-207), resulting in an mBS being as economical as wireless subscriber station. There can be some differences since mBS (211,213) can require a directional antenna for backhaul link 251 or 253. However, mBS (211, 213) typically is able to use the same radio for communicating through either the omni-directional antenna or the directional antenna through simple switches.

Figure 3:
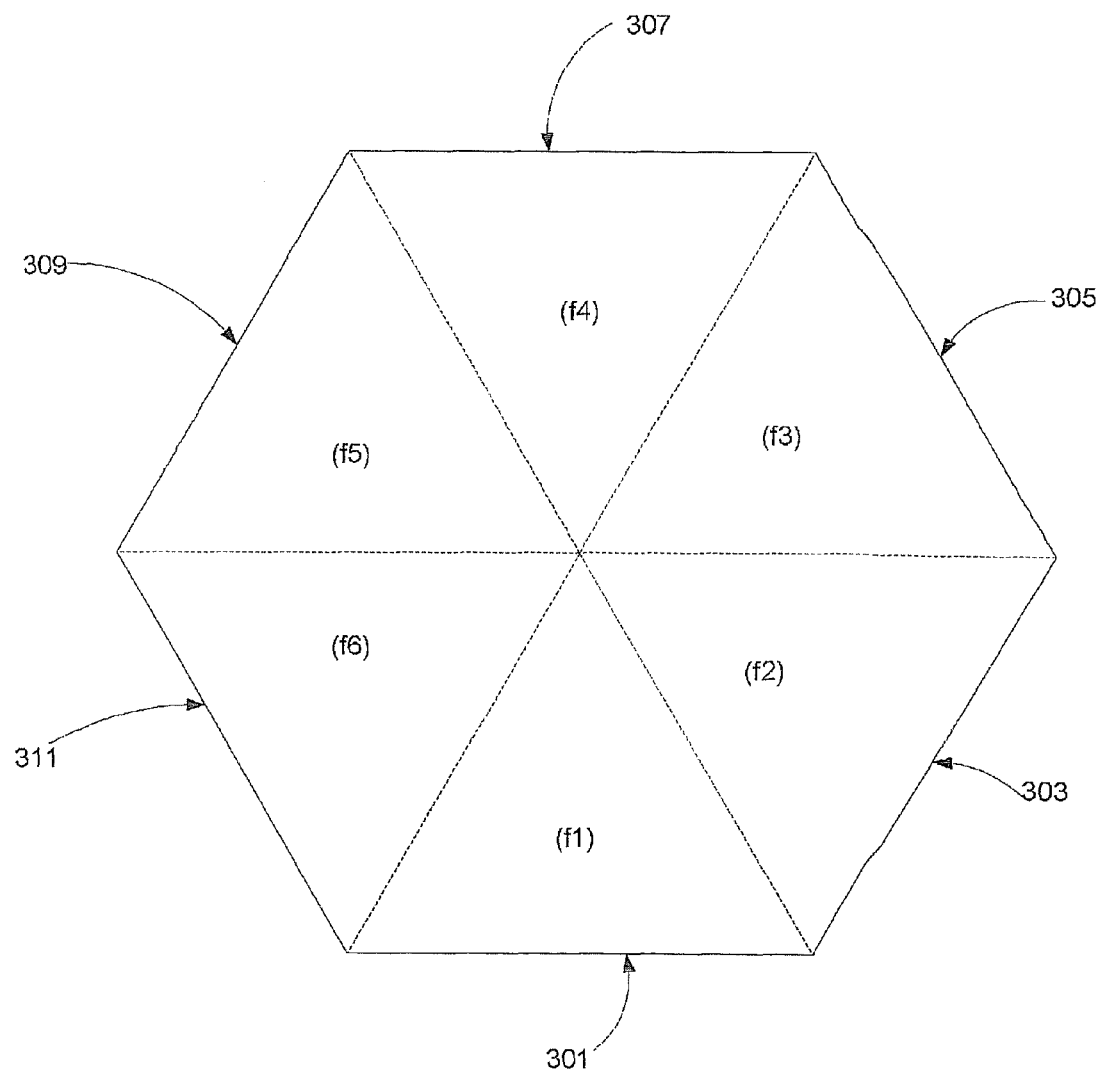
FIG. 3 shows sector frequency allocations of a wireless base station according to prior art.

FIG. 3 shows sector frequency allocations for a wireless base station according to prior art. FIG. 3 shows a conventional cell with six sectors 301-311, each using a different, non-interfering frequency spectrum. The BS is located at an approximate center of the cell and is assumed to have six different radios and correspondingly, six different directional antennas.

Figure 4:
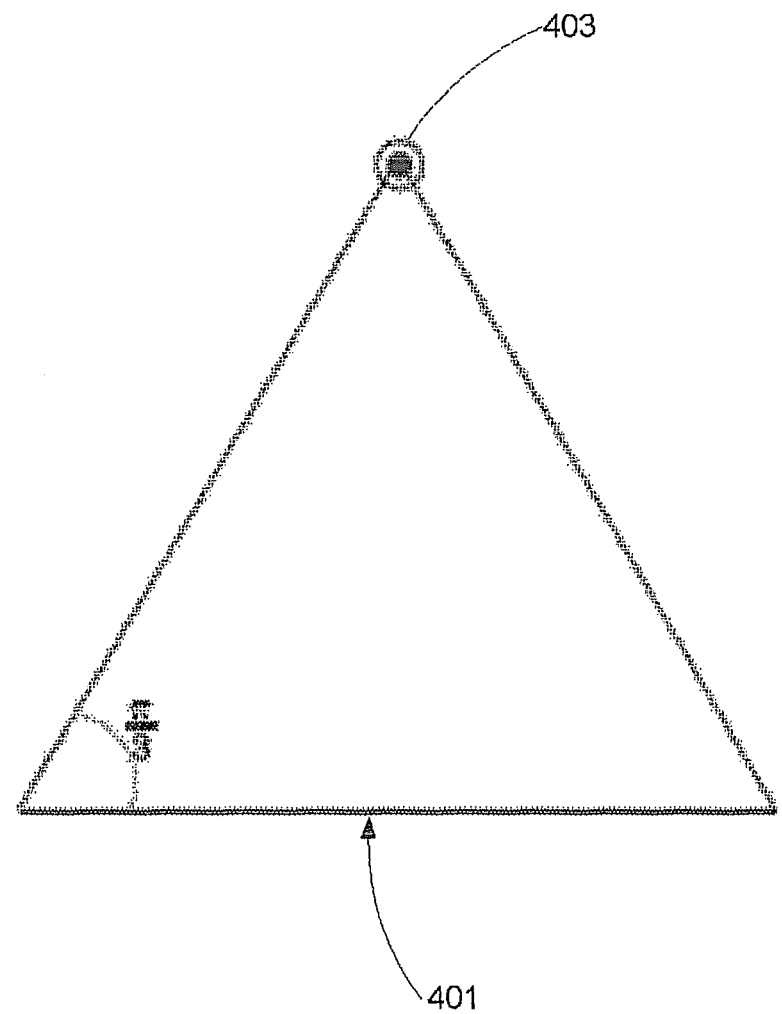
FIG. 4 shows a sector configuration of a wireless network according to prior art.

FIG. 4 shows a sector coverage area 401 of a wireless network that is supported by wireless base station according to prior art. Sector coverage area 401 corresponds to any of the six sector areas 301-311 as shown in FIG. 3.

Figure 5:
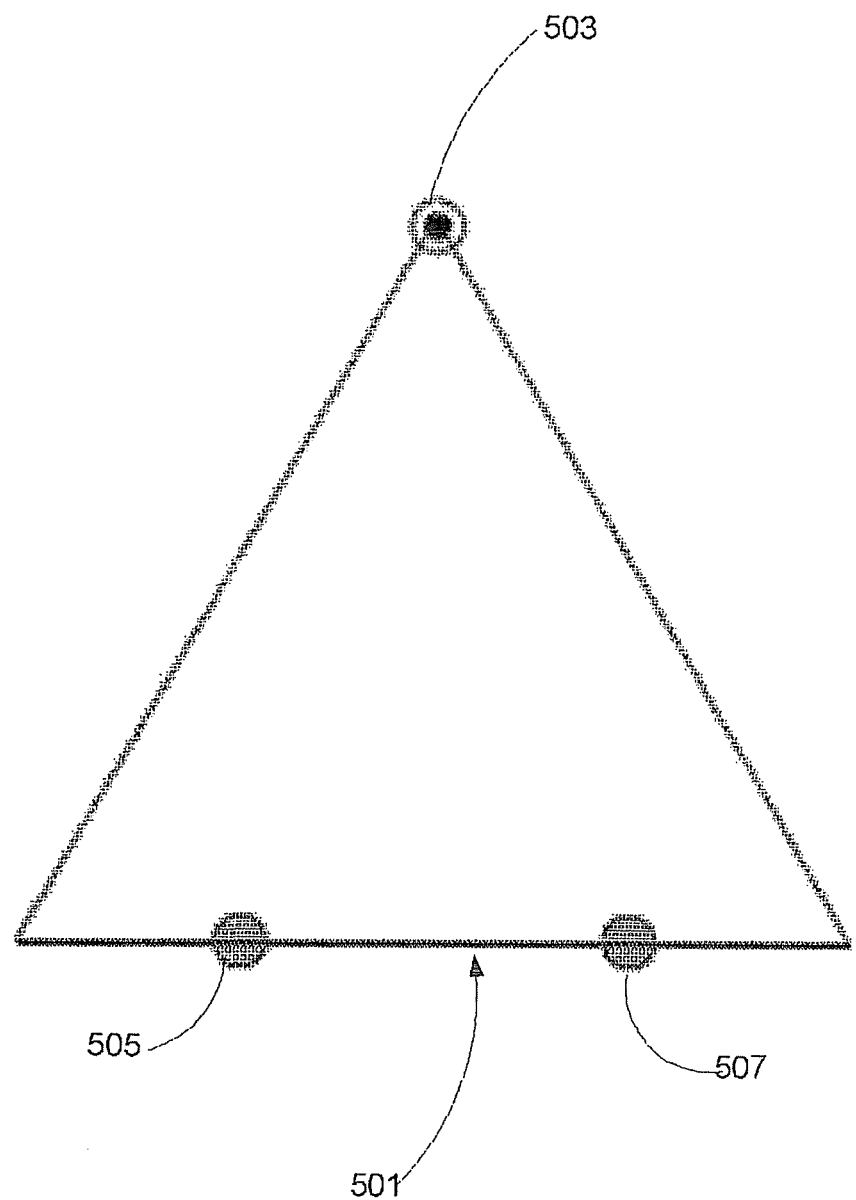
FIG. 5 shows a sector configuration of a wireless network according to an embodiment.

FIG. 5 shows a sector coverage area 501 that is supported by wireless base station 503 according to an embodiment. Mesh base stations 505 and 507 are incorporated at an approximate boundary of sector coverage area 501. Consequently, mesh base stations 505 and 507 are farthest from wireless base station 503 in a region where base station 503 typically has the worst transmission characteristics. Moreover, wireless subscriber stations (nodes, not shown) at the extremities in a conventional sector need to transmit at a higher power, thus causing higher interference. The placement of a mesh base station at the base of the triangle representing a sector helps alleviate both issues. Instead of placing just one mesh base station at the middle of the base of the triangle, an embodiment places two mBS's 505 and 507 symmetrically in order to cover the entire base of the triangle. A single mBS can require the antenna pattern of the mBS to be contorted, resulting in complex antennas that are costly to build. Given the corresponding model, one wishes to analyze whether simultaneous use of spectrum by two different subscriber stations is feasible. If indeed it is possible to simultaneously schedule two users, one to wireless base station 503 and the other to one of the mesh base stations 505 or 507, then one expects a throughput gain for the sector.

Figure 6:
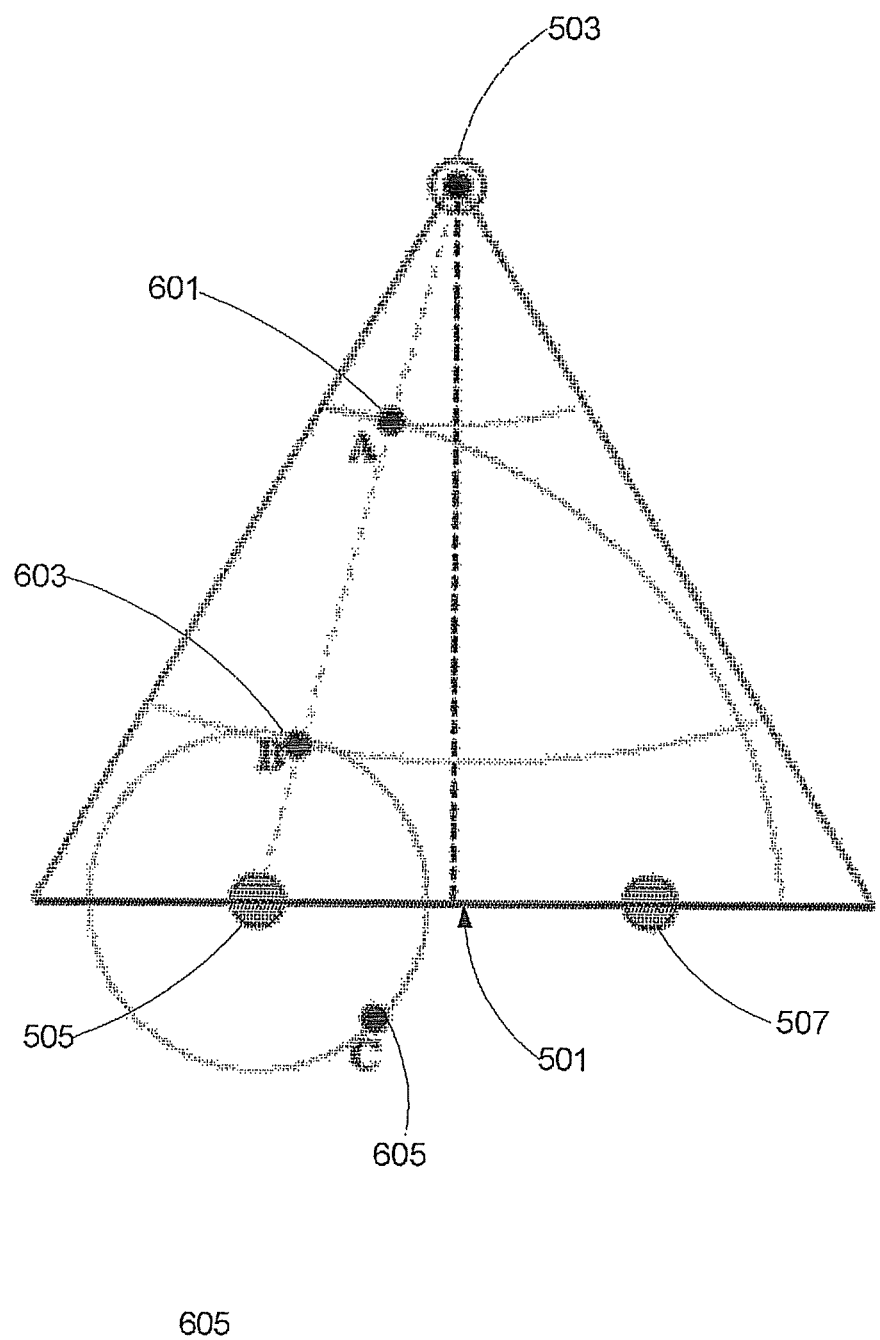
FIG. 6 shows simultaneous scheduling in a sector of a wireless network according to an embodiment.

FIG. 6 shows simultaneous scheduling in sector coverage area 501 of a wireless network according to an embodiment. For example, wireless subscriber station (node A) 601 can be scheduled to receive from BS 503 at the same time period a wireless subscriber station (node B) 603 or wireless subscriber station (node C) 605 is scheduled to receive from mBS 505. This is because the interference from the mBS 505 at node A 601 is sufficiently attenuated and hence the Signal-to-Noise-and-InterferenceRatio (SINR) at node A 601 is sufficient for correct reception from BS 503. Similarly, the SINR at node B 603, even in the presence of interference from BS 503, is sufficient for satisfactory reception from mBS 505. Node C 605, even though not located in sector coverage area 501, can be supported by mBS 505 because node C 605 is within a coverage radius of mBS 505.

Figure 7:
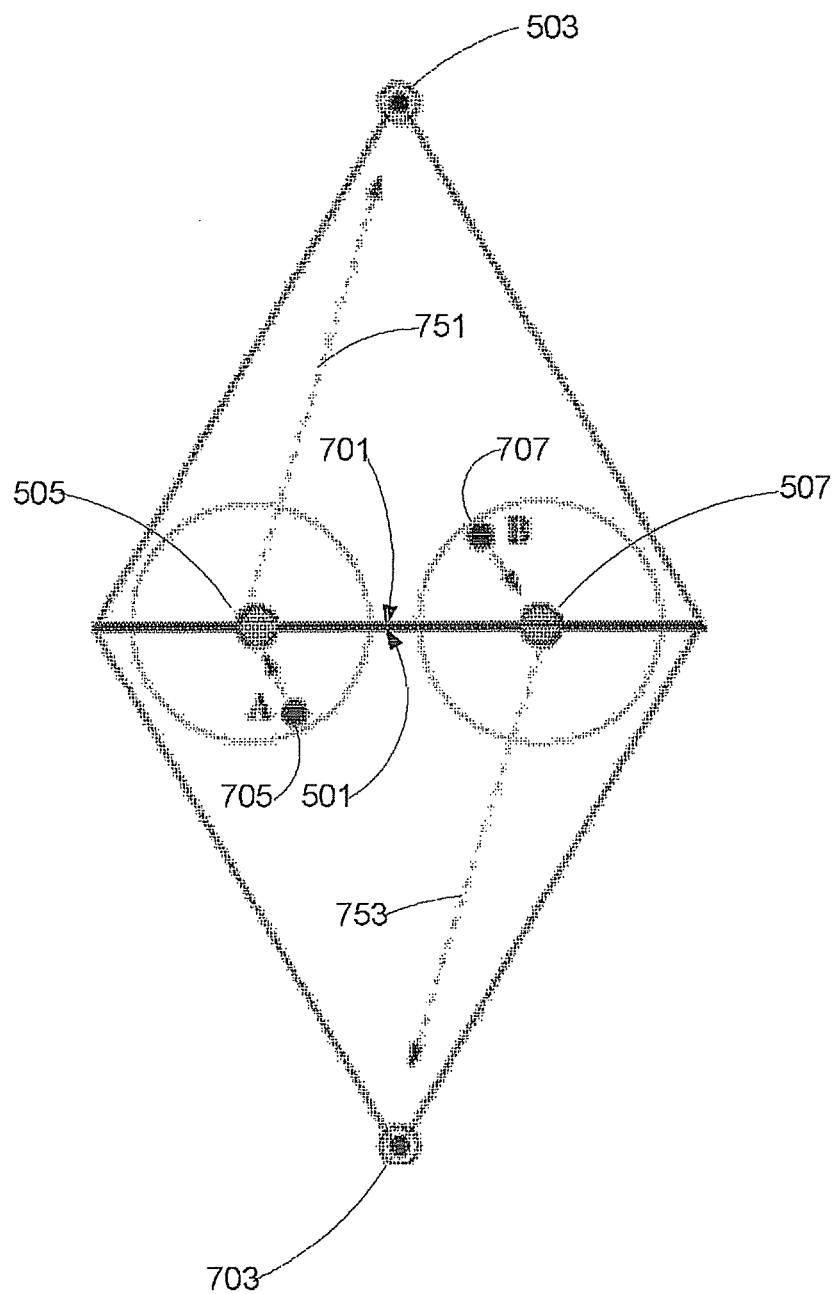
FIG. 7 shows an adjacent sector configuration of a wireless network according to an embodiment.

FIG. 7 shows adjacent sector coverage areas 501 and 701 of a wireless network according to an embodiment. Referring to FIG. 6, one can select node C 605 rather than node B 603 to be scheduled simultaneously with node A 601. The SINR at node C 605 is typically higher than the SINR at node B 603 since BS 503 is farther away from node C 605 than BS 503 is from node B 603. As a result, instead of analyzing just the single sector, one is motivated to analyzing a coverage area comprising two adjacent sector coverage areas as shown in FIG. 7.

Adjacent sector coverage areas 501 and 701 are assigned different frequency spectra. Mesh base station 505 communicates with BS 503 over backhaul link 751 even though many of the served users (e.g., node A 705) can actually be located in the lower sector (sector coverage area 701). Similarly, the mBS 707 can serve users (e.g., node B 707) which are located in the upper sector (sector coverage area 501) even though mBS 707 communicates with BS 703 over backhaul link 753.

Figure 8:
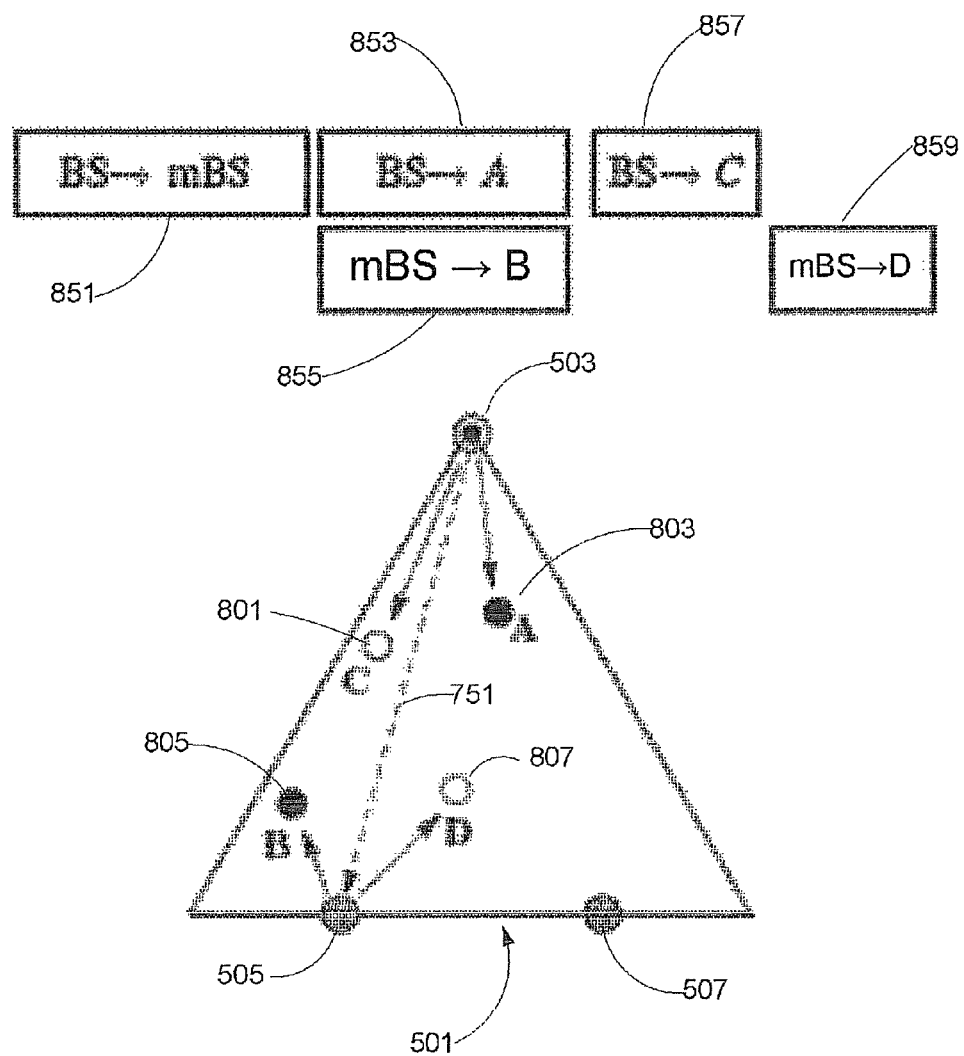
FIG. 8 shows an example downlink scheduling in a sector according to an embodiment.

FIG. 8 shows an example downlink scheduling in sector coverage area 501 according to an embodiment. A pair of wireless subscriber stations (e.g., node B 805 and node A 803) is identified for simultaneous scheduling of communications with BS 503 and mBS 505. FIG. 8 shows an exemplary downlink scheduling frame (comprising data packets 851-859) which is compatible with the frame structure currently used in IEEE 802.16. Nodes A and B 803 and 805 are simultaneously scheduled to receive from BS 503 and mBS 505, respectively. Nodes C and D 801 and 807 are dedicatedly scheduled to receive from BS 503 and mBS 859, respectively. The downlink frame contains the following periods:

Backhaul period (corresponding to data packet 851): In this period the data is forwarded from the BS to the mBS using the backhaul link. This data is meant for node Band D;

Simultaneous Schedule period (corresponding to data packets 853 and 855): In this period the BS transmits data to node A and at the same time the mBS forwards the data meant for B that the mBS received in the immediately preceding backhaul period; and Dedicated Schedule period (corresponding to data packets 857 and 859): This period consists of two consecutive periods. In the first part the BS transmits data to node C and in the second part the mBS forwards data to node D.

While the above example illustrates transmission on the downlink (from the infrastructure to the wireless subscriber station), transmission can be scheduled on the uplink (from the wireless subscriber station to the infrastructure).

FIG. 9 shows an example of a modulation scheme 900 in accordance with an embodiment. FIG. 9 shows different modulation schemes that can be used and the corresponding SINR thresholds and transmission rates, corresponding to different modulation configurations. In an embodiment, modulation scheme 905 (64QAM) is used for the BS ↔ mBS backhaul link (e.g., links 751 and 753 as shown in FIG. 7).

FIG. 10 shows an example of simulation parameters in accordance with an embodiment. The remaining parameters used for the simulation are shown in FIG. 10. In an embodiment, the Erceg-Greenstein model is used as the large scale fading model and most of the results are shown for terrain A of the Erceg-Greenstein model. Terrain A is representative of areas with moderate to heavy tree density. Simulations with the other terrain types were performed with similar results.

Figure 11:
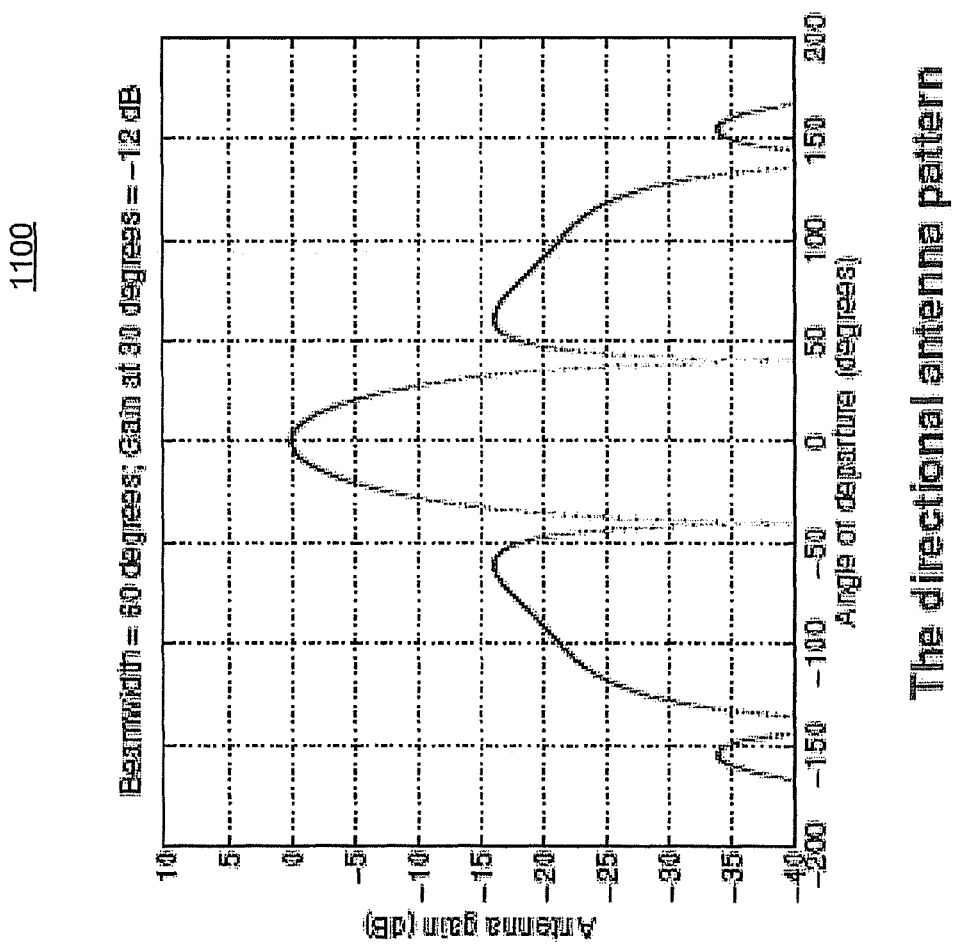
FIG. 11 shows a directional antenna pattern in accordance with an embodiment.

FIG. 11 shows a directional antenna pattern used for the antenna at wireless base stations 503 and 703 (as shown in FIG. 7) in accordance with an embodiment. Mesh base stations 505 and 507 and wireless subscriber stations 705-707 utilize omni directional antennas. The directional antenna at BS (503, 703) has a beamwidth of 30 degrees. The gain at an angle of departure of 0 degrees from the azimuth of the directional antenna, i.e., the peak gain of the antenna, is 0 dBi and the gain at an angle of departure of 30 degrees is −12 dBi. Since one assumes an antenna gain of 20 dBi, the corresponding effective gains are 20 dBi and 8 dBi, respectively.

Figure 12:
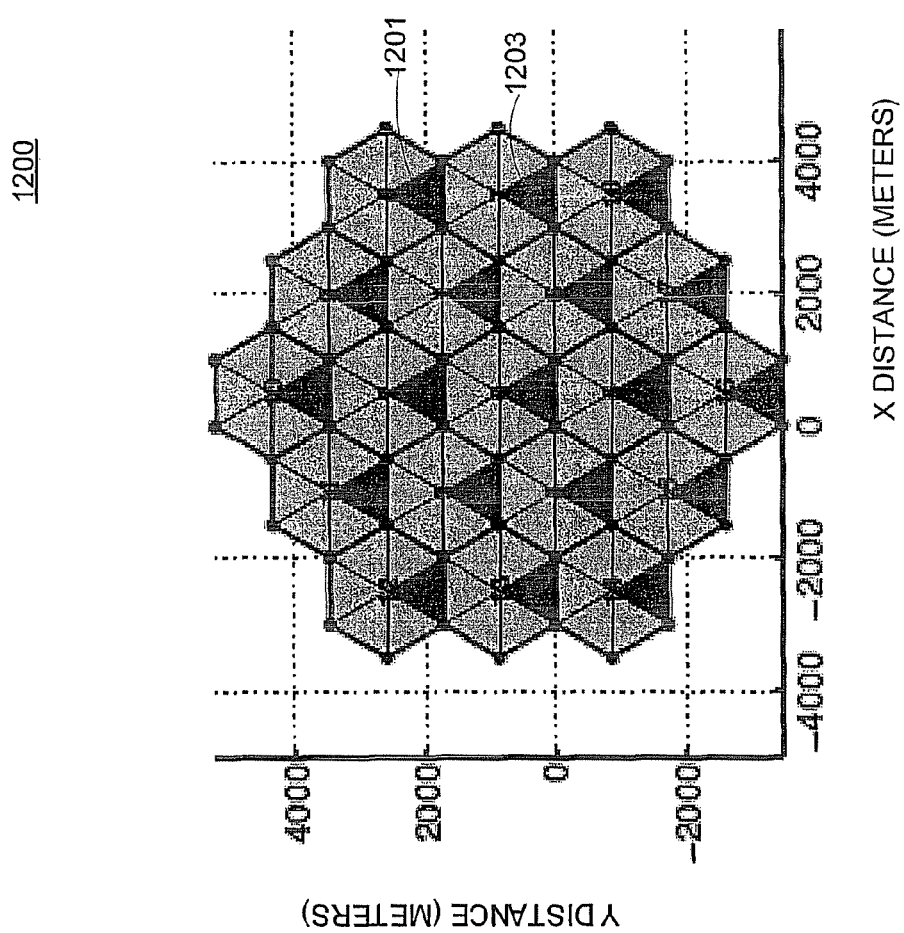
FIG. 12 shows a multicell configuration in accordance with prior art.

FIG. 12 shows a multicell configuration 1200 in accordance with prior art. In the scatter plots shown in FIGS. 14 and 15, sector coverage areas 1201 and 1203 are assigned the same frequency spectrum. In the analysis of the downlink throughput and coverage, interference from cells which are at most two cells away from the analyzed sector is considered.

Figure 13:
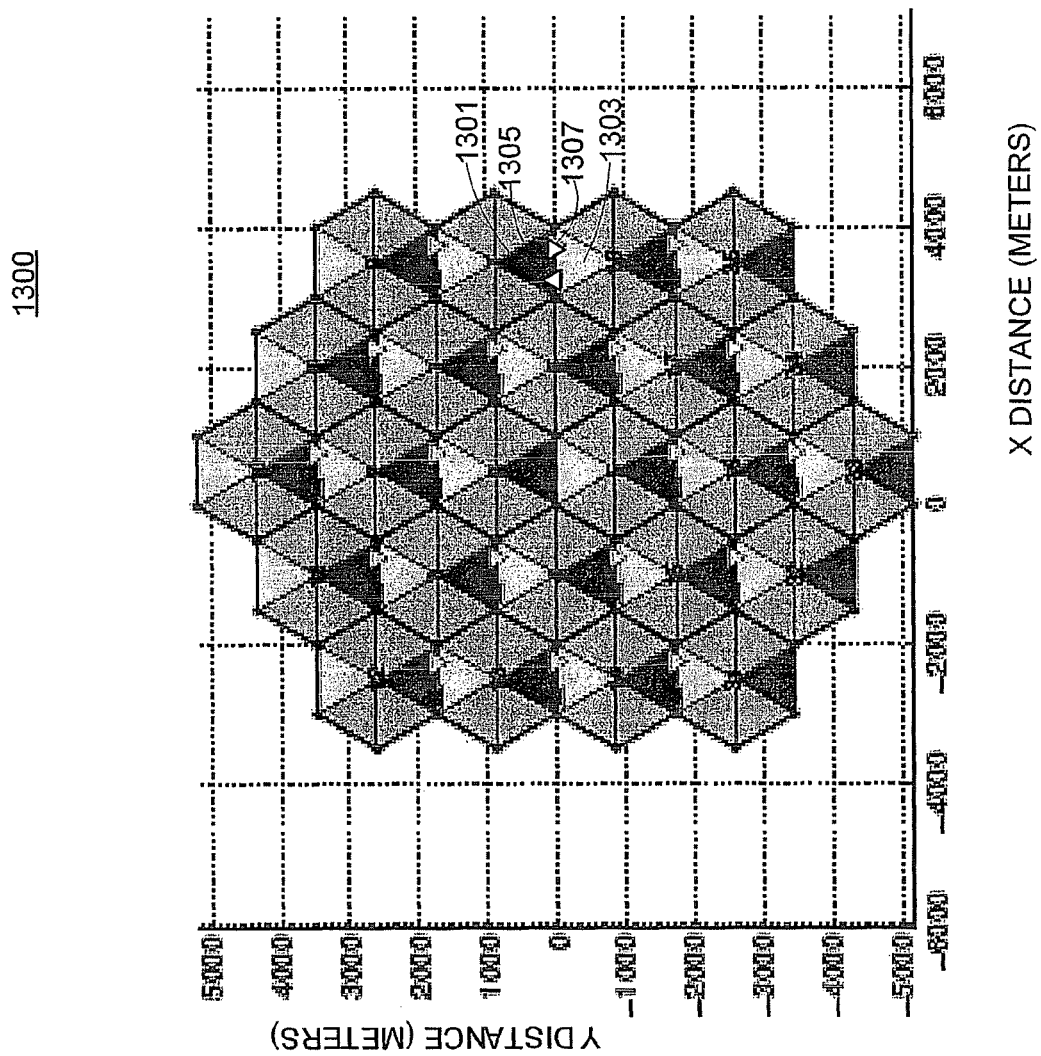
FIG. 13 shows a multicell configuration in accordance with an embodiment.

FIG. 13 shows a multicell configuration 1300 in accordance with an embodiment. In the scatter plots shown in FIGS. 16-19, downlink performance is determined in the presence of mesh base stations 1305 and 1307 serving sector coverage areas 1301 and 1303. In the analysis, the wireless system has a (1,6,6) spectrum configuration (corresponding each cell being assigned the same frequency spectrum, each cell being divided into 6 sectors, and each sector having a corresponding frequency allocation.) As will be discussed in FIGS. 16-19, the improvement in the mesh system in terms of coverage and throughput more than compensates for the radio resources that are diverted towards the mBS↔BS backhaul. The mesh base station is designed to be simple and hence cost effective, thus not creating any economic hurdle in their deployment. Simulations have shown a coverage improvement of around 80% whereas the sector throughput increases from 16 Mbps to 21 Mbps. In addition, embodiments can support power control so that transmissions are made at the optimum power required for a particular SINR to be achieved between the transmitter and the receiver. One consequently expects a decrease of inter-cell interference caused by wireless subscriber stations at the periphery of a cell.

Embodiments also support uplink scheduling, which can be symmetric or asymmetric with respect to downlink scheduling. For example, a wireless subscriber station can communicate during different time periods for the uplink and the downlink. Also, a wireless subscriber station can communicate with a mesh base station in one direction and directly communicate with a wireless base station in the other direction.

Figure 14:
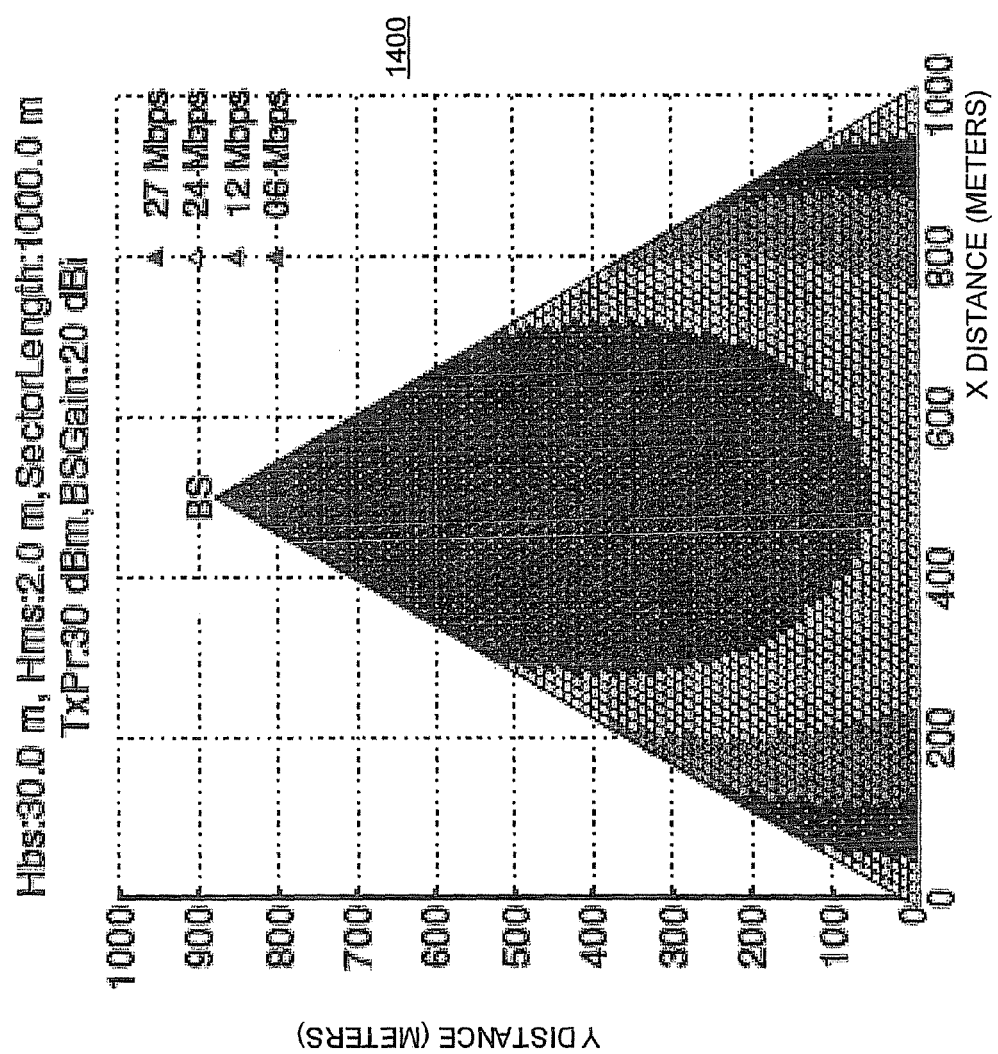
FIG. 14 shows a scatter plot without a log normal distribution in accordance with prior art.
Figure 15:
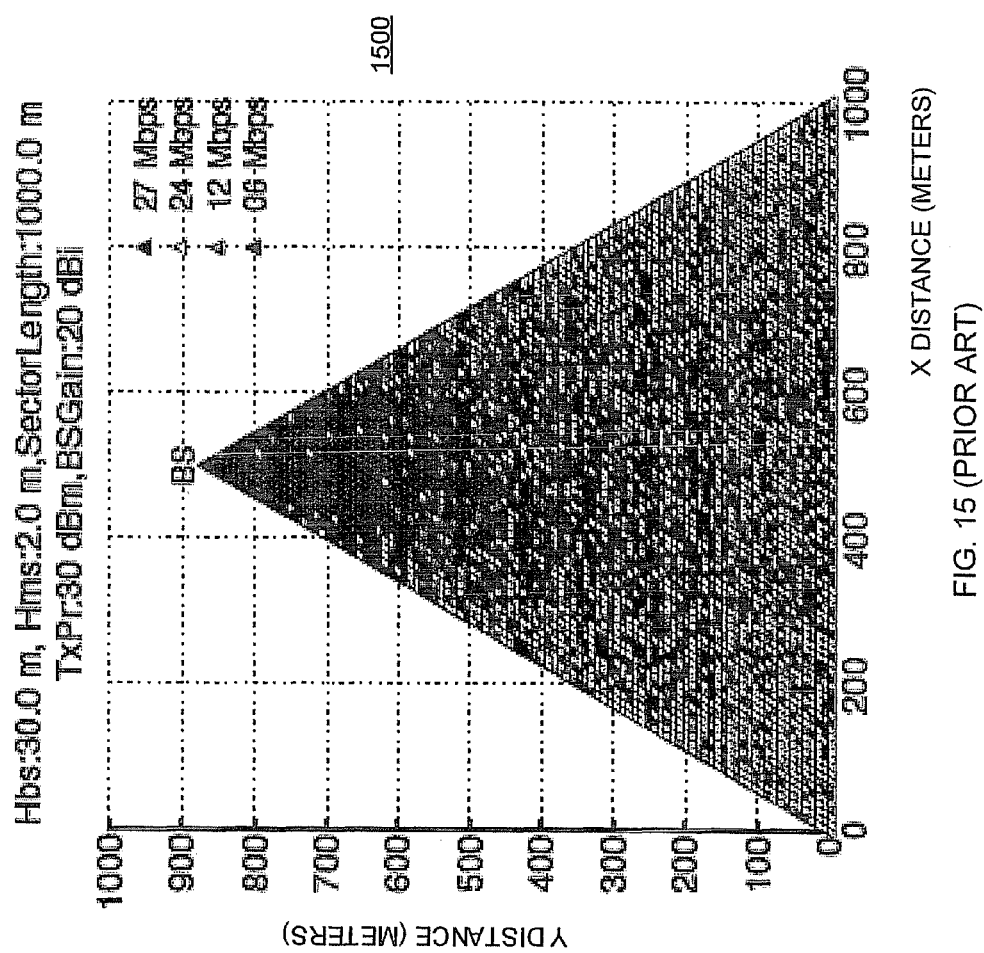
FIG. 15 shows a scatter plot with a log normal distribution in accordance with prior art.

FIG. 14 shows a scatter plot 1400 without a log normal distribution in accordance with prior art. FIG. 15 shows a scatter plot 1500 with a log normal distribution in accordance with prior art. (Scatter plots 1400 and 1500 correspond to multi-cell configuration 1200 as shown in FIG. 12.) With scatter plot 1400 no log normal variation was applied to the path loss, while with scatter plot 1500 log normal variation was applied to the path loss.

Figure 16:
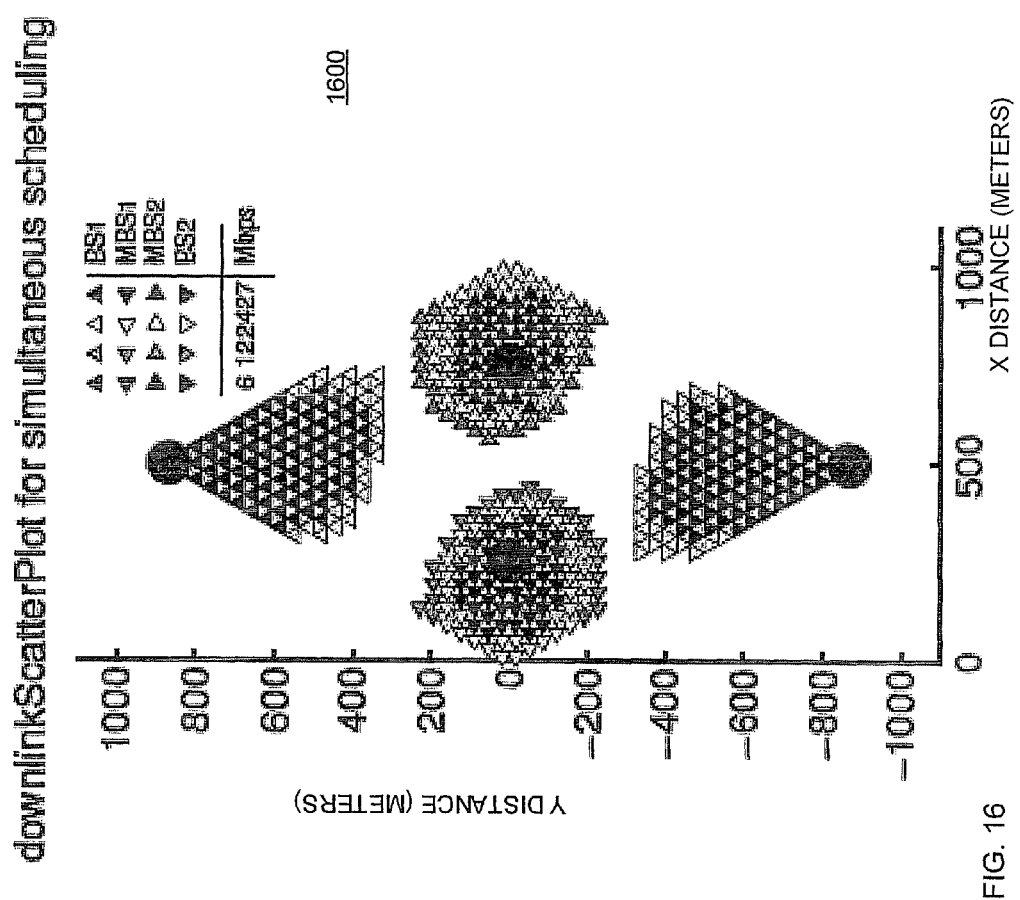
FIG. 16 shows a downlink scatter plot for simultaneous scheduling without a log normal distribution in accordance with an embodiment.
Figure 17:
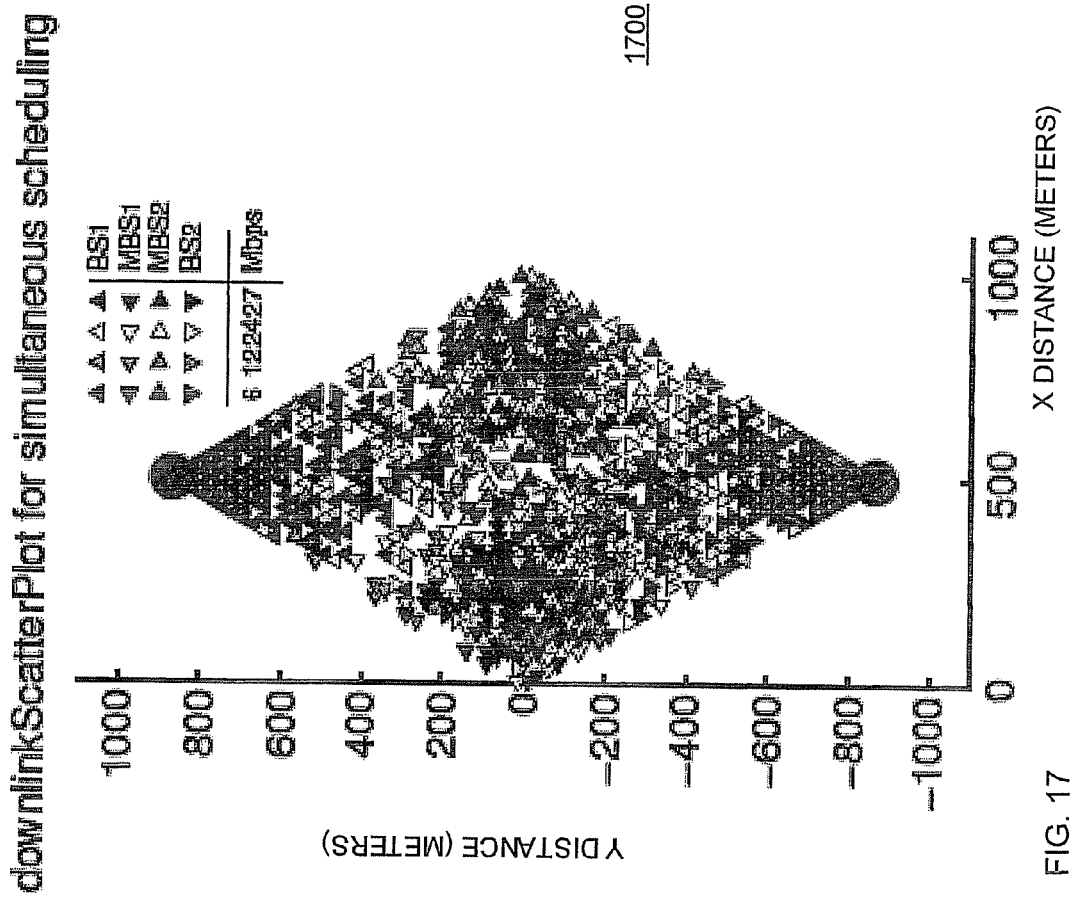
FIG. 17 shows a downlink scatter plot for simultaneous scheduling with a log normal distribution in accordance with an embodiment.
Figure 18:
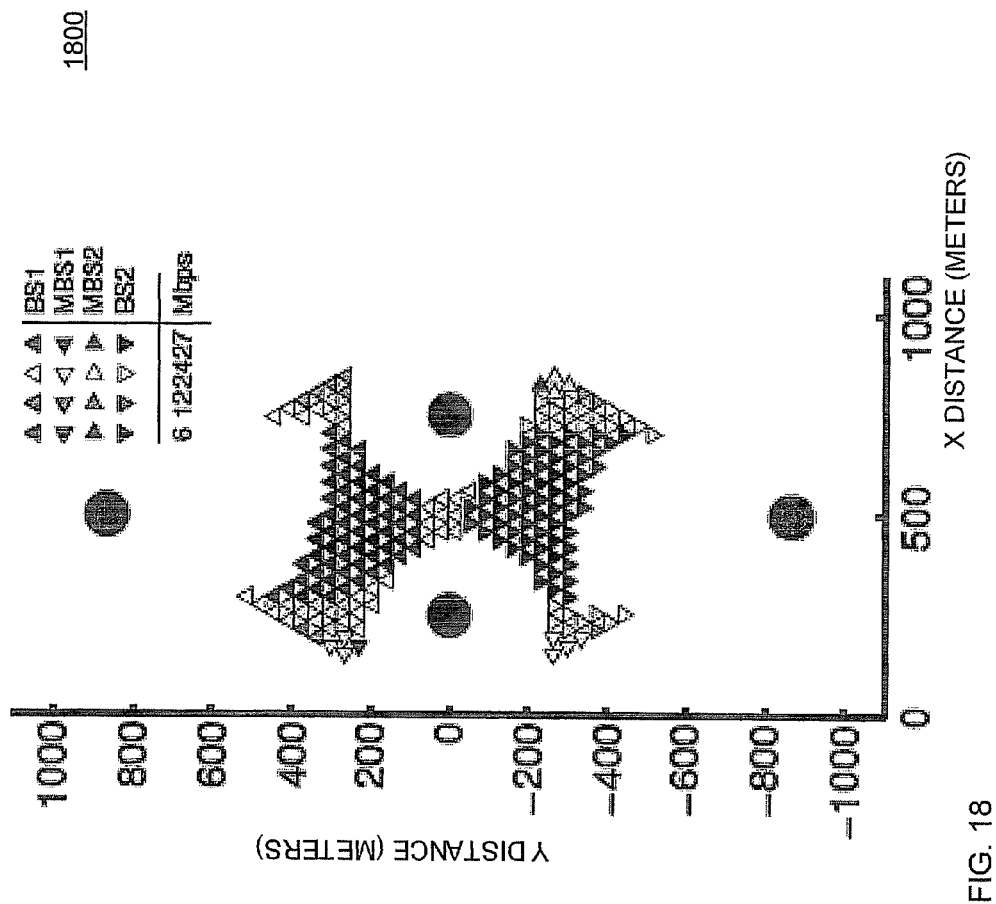
FIG. 18 shows a downlink scatter plot for dedicated scheduling without a log normal distribution in accordance with an embodiment.
Figure 19:
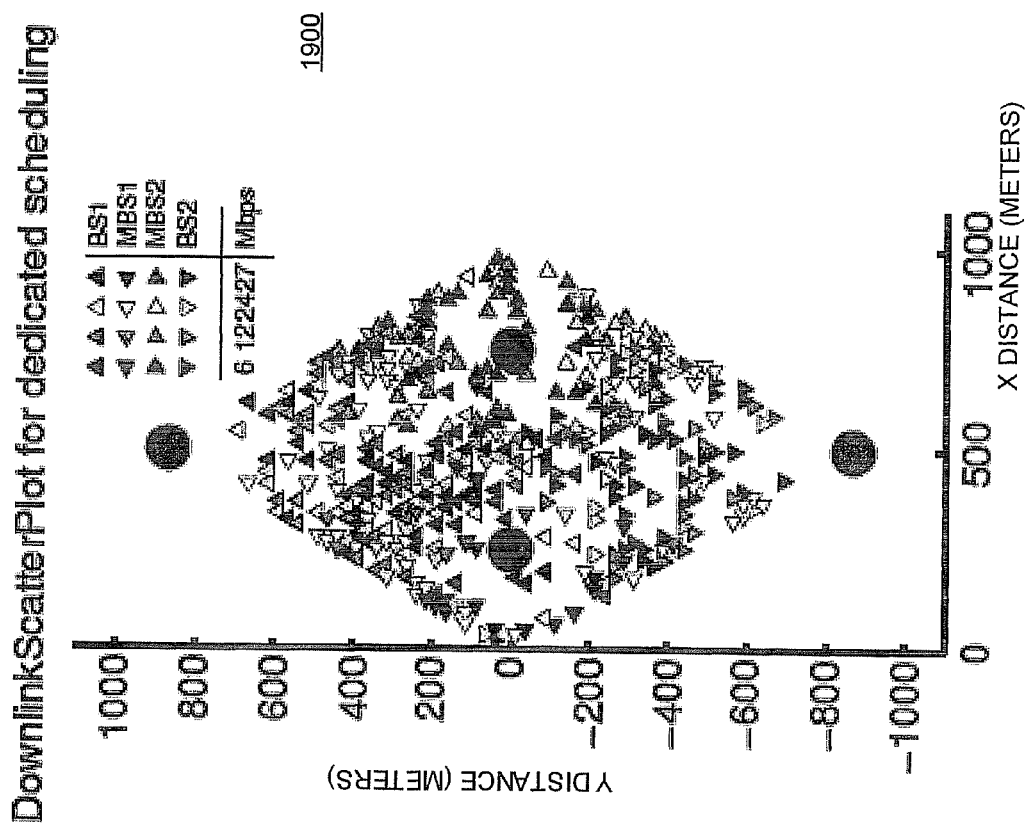
FIG. 19 shows a downlink scatter plot for dedicated scheduling with a log normal distribution in accordance with an embodiment.

FIGS. 16-19 show the points which can be simultaneously scheduled in the presence of mesh base stations and points which require dedicated scheduling. FIG. 16 shows a downlink scatter plot 1600 for simultaneous scheduling without a log normal distribution in accordance with an embodiment. FIG. 17 shows a downlink scatter plot 1700 for simultaneous scheduling with a log normal distribution in accordance with an embodiment. FIG. 18 shows a downlink scatter plot 1800 for dedicated scheduling without a log normal distribution in accordance with an embodiment. FIG. 19 shows a downlink scatter plot 1900 for dedicated scheduling with a log normal distribution in accordance with an embodiment. (Scatter plots 1600, 1700, 1800, and 1900 correspond to multi-cell configuration 1300 as shown in FIG. 1300.) FIGS. 16 and 18 show the scatter plots when no log normal variation is used to calculate path loss. FIGS. 17 and 19 show scatter plots in which log normal variation in path loss is included. (One expects that a log normal variation in the path loss provides results that better approximate an actual situation.) As a result there is no clear demarcation between the region which requires simultaneous scheduling and the region which requires dedicated scheduling as shown in FIGS. 17 and 19. However, this demarcation is clearly visible in FIGS. 16 and 18.

Figure 20:
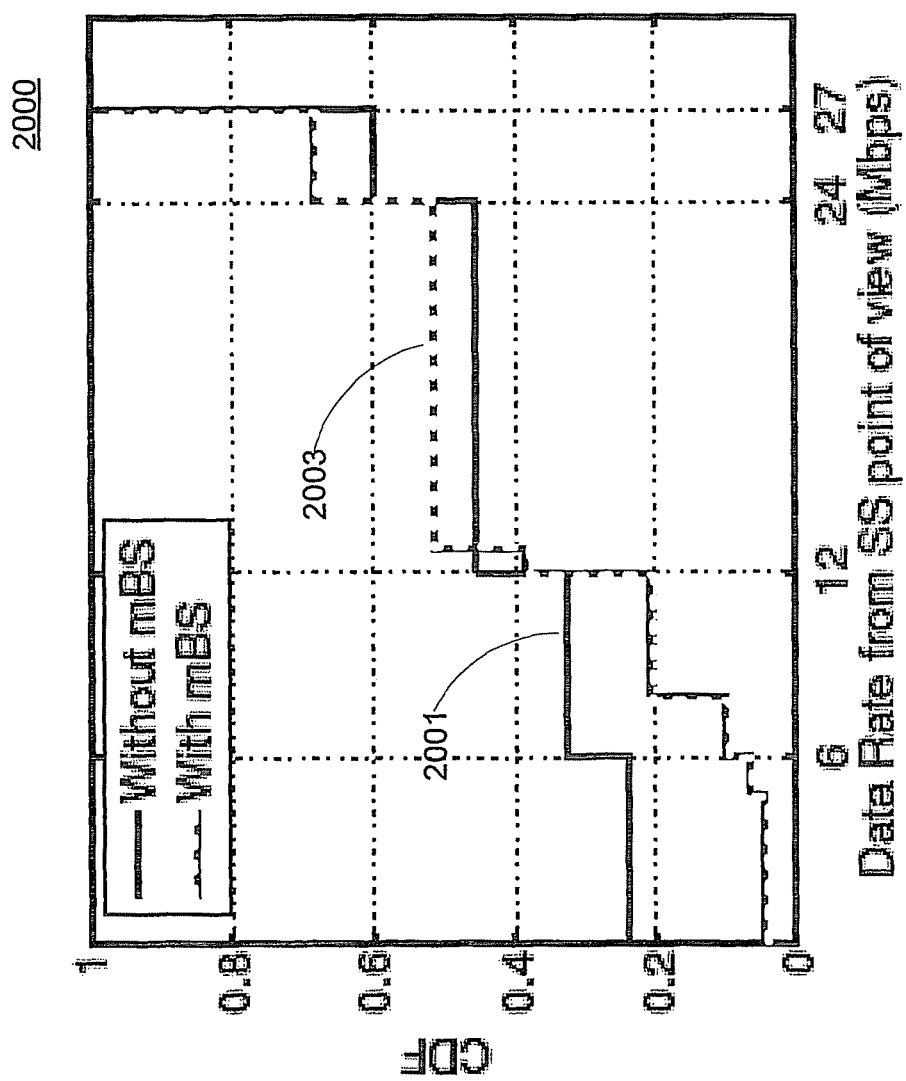
FIG. 20 shows a cumulative density function of data rates for wireless subscriber stations in accordance with an embodiment.

FIG. 20 shows a cumulative density function (CDF) 2000 of data rates for wireless subscriber stations in accordance with an embodiment. Even though the actual transmission rates are as shown in FIG. 9, CDF plot 2000 for the data rates in the presence of mesh base stations has transitions that do not match with the transmission rates shown in FIG. 9. This observation results when a wireless subscriber station communicates with a wireless base station via mesh base station, in which the actual data rate that the wireless subscriber station encounters is less than the transmission rate that the wireless subscriber station is able to transmit or receive at. Correspondingly, data must be transmitted over the backhaul link, during which time no other transmission can be performed in the sector (e.g., the scheduling as shown in FIG. 8). FIG. 20 suggests that a large number of wireless subscriber stations that were not able to communicate in the conventional case (corresponding to multi-cell configuration 1200 as shown in FIG. 12) are able to do so in the presence of mesh base stations (corresponding to multi-cell configuration 1300 as shown in FIG. 13).

Figure 21:
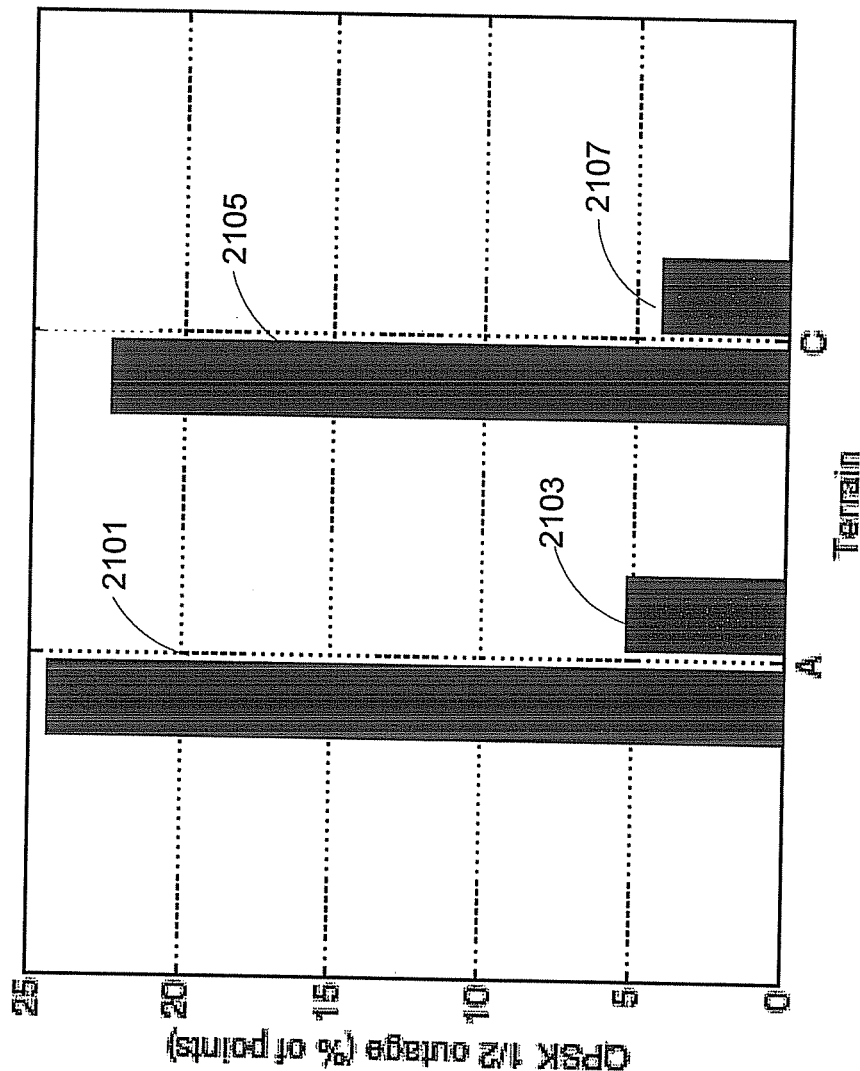
FIG. 21 shows an outage rate for wireless subscriber stations in accordance with an embodiment.
Figure 22:
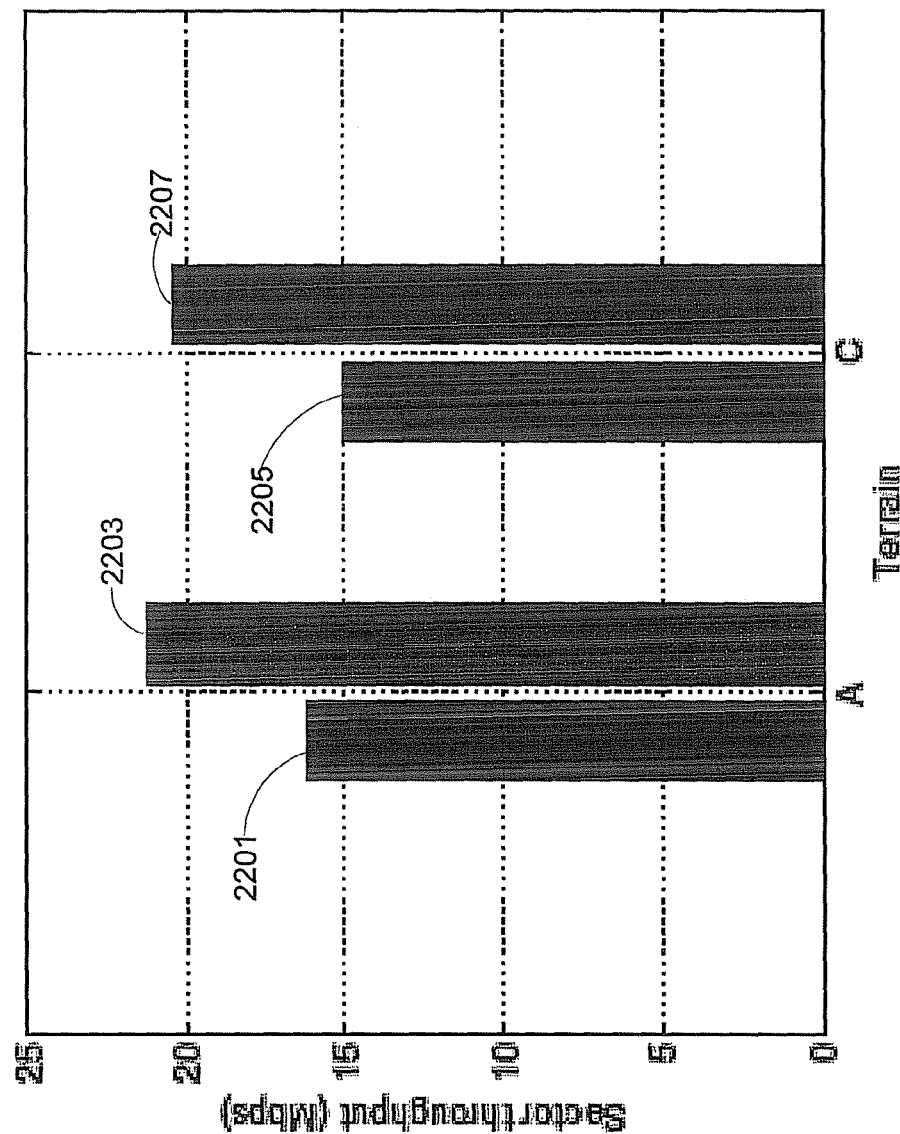
FIG. 22 shows a sector throughput for a wireless system in accordance with an embodiment.

FIG. 21 shows an outage rate for wireless subscriber stations using a QPSK ½ modulation scheme in accordance with an embodiment. One observes a significant decrease in the outage rate comparing a configuration without mesh base stations (rates 2101 and 2105) to a configuration with mesh base stations (rates 2103 and 2107). FIG. 22 shows a corresponding sector throughput for a wireless system in accordance with an embodiment. One observes an increase of the sector throughput comparing a configuration without mesh base stations (data throughputs 2201 and 2205) to a configuration with mesh base stations (data throughputs 2203 and 2207).

Embodiments support operational scenarios in which a wireless base station goes out of service. As an example, refer to the wireless network as shown in FIG. 7. As previously discussed, mesh base station 505 communicates with wireless base station 503 over backhaul link 751, and mesh base station 507 communicates with wireless base station 703 over backhaul link 753. If wireless base station 503 goes out of service, then mesh base station 505 establishes a backhaul link to wireless base station 703 and can also expand its coverage into sector coverage area 501. (The backhaul link can be established in a number of ways. For example, a directional communication path can be established between mesh base station 505 and wireless base station 703. Alternatively, another time period can be scheduled for backhauling between mesh base station 505 and wireless base station 703.) Traffic for wireless subscriber stations within the coverage radius of mesh base station 505 are consequently diverted to wireless base station 703.

Embodiments also support operational scenarios in which a wireless base station exceeds a predetermined level of traffic (i.e., overload). As an example, refer to the wireless network as shown in FIG. 7. As previously discussed, mesh base station 505 communicates with wireless base station 503 over backhaul link 751, and mesh base station 507 communicates with wireless base station 703 over backhaul link 753. If wireless base station 503 exceeds a predetermined traffic limit, then mesh base station 505 establishes a backhaul link to wireless base station 703 so that traffic can be diverted wireless base station 503. In such a scenario, traffic for wireless subscriber stations within the coverage radius of mesh base station 505 is consequently supported by wireless base station 703. Moreover, the coverage radius of mesh base station 505 can be adjusted to change the number of wireless subscriber stations that are diverted from wireless base station 503 to wireless base station 703. The coverage area of mesh base station 505 can be adjusted by adjusting the transmit power level and/or receive sensitivity.

As can be appreciated by one skilled in the art, a computer system with an associated computer-readable medium containing instructions for controlling the computer system can be utilized to implement the exemplary embodiments that are disclosed herein. The computer system can include at least one computer such as a microprocessor, a digital signal processor, and associated peripheral electronic circuitry. Other hardware approaches such as utilizing a digital signal processor (DSP), utilizing a field programmable gate array (FPGA), etc. can also be used to implement the exemplary embodiments.

Those skilled in the art will appreciate that there are numerous variations and permutations of the above described systems and techniques that fall within the spirit and scope of embodiments disclosed herein as set forth in the appended claims.

What is claimed is:
1. A method, comprising:
initiating, by a system comprising a processor, a wireless transmission of first data from a wireless base station device of a wireless coverage area to a mesh base station device of the wireless coverage area during a first transmission period; and initiating, by the system, concurrent wireless transmissions to respective wireless subscriber devices during a second transmission period following the first transmission period, wherein a first wireless transmission of the concurrent wireless transmissions comprises a first transmission of the first data from the mesh base station device to a first wireless subscriber device of the respective wireless subscriber devices, wherein the first transmission utilizes an assigned frequency, wherein a second wireless transmission of the concurrent wireless transmissions comprises a second transmission of second data that is different than the first data from the wireless base station device to a second wireless subscriber device of the respective wireless subscriber devices, and wherein the second transmission utilizes the assigned frequency.

2. The method of claim 1, further comprising:
initiating, by the system, a determination of a traffic load of the wireless base station device.

3. The method of claim 2, further comprising:
in response to initiating a transfer of traffic load data representing the traffic load, initiating, by the system, a change of a transmit power of the mesh base station device based on the traffic load data.

4. The method of claim 1, further comprising:
initiating, by the system, a reception of a set of traffic load data for the wireless base station device; and
initiating, by the system based on the set of traffic load data, a modification of a sensitivity value of the mesh base station device relating to a sensitivity of reception of signals by the mesh base station device.

5. The method of claim 1, wherein the initiating the concurrent wireless transmissions comprises initiating the first wireless transmission using a code sequence, and initiating the second wireless transmission using the code sequence.

6. A system, comprising:
a processor; and
a memory that stores executable instructions that, when executed by the processor, facilitate performance of operations, comprising:
initiating a first wireless transmission of a first data packet from a first wireless base station device within a wireless coverage region to a first mesh base station device within the wireless coverage region during a first designated transmission period; and
in response to the initiating of the first wireless transmission, initiating concurrent wireless transmissions comprising a second wireless transmission and a third wireless transmission, wherein the second wireless transmission comprises a mesh base station transmission of the first data packet from the first mesh base station device to a first wireless subscriber device according to a defined frequency during a second designated transmission period following the first designated transmission period, and wherein the third wireless transmission comprises a wireless base station transmission of a second data packet from the first wireless base station device to a second wireless subscriber device according to the defined frequency during the second designated transmission period.

7. The system of claim 6, wherein the first wireless subscriber device is located in a sector coverage area associated with the first wireless base station device.

8. The system of claim 6, wherein the processor further facilitates the execution of the executable instructions to perform operations, comprising:
initiating a first transmission of first data between a second mesh base station device and a second wireless base station device during the first designated transmission period.

9. The system of claim 8, wherein the second mesh base station device is positioned with respect to the first mesh base station device within a defined distance from a determined boundary between a first sector coverage area associated with the first wireless base station device and a second sector coverage area associated with the second wireless base station device.

10. The system of claim 8, wherein the processor further facilitates the execution of the executable instructions to perform operations, comprising:
initiating a second transmission of the first data between the second mesh base station device and a third wireless subscriber device during the second designated transmission period utilizing a designated wireless resource allocation.

11. The system of claim 10, wherein the processor further facilitates the execution of the executable instructions to perform operations, comprising:
initiating a third transmission of second data between the second wireless base station device and a fourth wireless subscriber device during the second designated transmission period utilizing the designated wireless resource allocation.

12. The system of claim 10, wherein the designated wireless resource allocation comprises a time slot allocation.

13. The system of claim 10, wherein the designated wireless resource allocation comprises a code sequence allocation.

14. A machine-readable storage medium, comprising executable instructions that, when executed by a wireless base station device comprising a processor, facilitate performance of operations, comprising:
sending, during a backhaul period within a wireless coverage area, a first wireless signal comprising first data directed to a mesh base station device of the wireless coverage area for facilitating a transmission, by the mesh base station device, of a second wireless signal comprising the first data directed to a first wireless subscriber device during a concurrent transmission period following the backhaul period, wherein the transmission of the second wireless signal utilizes a wireless resource allocation, and wherein the backhaul period is associated with communications corresponding to a backhaul link between the wireless base station device and the mesh base station device; and
in response to the sending of the first wireless signal, sending a third wireless signal comprising second data different than the first data being directed to a second wireless subscriber device during the concurrent transmission period utilizing the wireless resource allocation.

15. The machine-readable storage medium of claim 14, wherein the operations further comprise:
determining traffic load data.

16. The machine-readable storage medium of claim 15, wherein the operations further comprise:
sending the traffic load data directed to the mesh base station device for facilitating a change of a transmit power of the mesh base station device as a function of the traffic load data.

17. The system of claim 6, wherein the operations further comprise:

determining traffic load data.

18. The system of claim 17, wherein the operations further comprise:

sending the traffic load data directed to the mesh base station device for facilitating a change of a transmit power of the mesh base station as a function of the traffic load data.

19. The machine-readable storage medium of claim 14, wherein the facilitating the transmission comprises facilitating the transmission, by the mesh base station device, of the second wireless signal using a code sequence, and wherein the sending the third wireless signal comprises sending the third wireless signal using the code sequence.

20. The machine-readable storage medium of claim 14, wherein the operations further comprise:

receiving traffic load data; and initiating, based on the traffic load data, a modification of a sensitivity of reception of signals by the mesh base station device.

\* \* \* \* \*